United States Patent
Roberts et al.

(10) Patent No.: US 10,858,855 B2
(45) Date of Patent: Dec. 8, 2020

(54) MODULAR ANTI-BALLISTIC SHELTER SYSTEM

(71) Applicant: United States of America as Represented by The Secretary of The Army, Alexandria, VA (US)

(72) Inventors: Justin M Roberts, Florence, MS (US); John M Hoemann, Vicksburg, MS (US); Craig R Ackerman, Gainesville, VA (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 0 days.

(21) Appl. No.: 16/355,459

(22) Filed: Mar. 15, 2019

(65) Prior Publication Data

US 2019/0368215 A1    Dec. 5, 2019

Related U.S. Application Data

(63) Continuation of application No. 15/461,333, filed on Mar. 16, 2017, now Pat. No. 10,443,260, and a
(Continued)

(51) Int. Cl.
*E04H 9/10* (2006.01)
*B23P 6/00* (2006.01)
(Continued)

(52) U.S. Cl.
CPC .................. *E04H 9/10* (2013.01); *B23P 6/00* (2013.01); *E04B 1/1912* (2013.01);
(Continued)

(58) Field of Classification Search
CPC ..... E04H 9/10; E04H 2001/1283; E04H 9/12; E06B 1/56; E06B 1/02; E04B 1/1912;
(Continued)

(56) References Cited

U.S. PATENT DOCUMENTS 1,995,573 A * 3/1935 Matthews ............. E04B 1/3483
52/79.9
3,568,388 A * 3/1971 Flachbart et al. ........ E04B 2/72
52/588.1

(Continued)

*Primary Examiner* — Brian E Glessner
*Assistant Examiner* — Adam G Barlow
(74) *Attorney, Agent, or Firm* — Brian C. Jones

(57) ABSTRACT

The modular anti-ballistic shelter system includes two end units and, optionally, additional middle units for a wider structure. End and middle units may also stack atop each other for multi-story structures. Each unit is configured to comply with both ISO standards for size and weight, and with the U.S. Department of State Certification Standard for Forced Entry and Ballistic Resistance of Structural Systems. Each exterior wall of each end unit and each middle unit is reinforced with wall studs that penetrate the unit's structural framework of beams and frames. Even though these wall studs are welded into place, penetration of the wall studs into the beams and frames ensures acceptable blast, ballistic, and forced entry resistance even if the welds are flawed.

16 Claims, 11 Drawing Sheets

Related U.S. Application Data continuation-in-part of application No. 15/461,226, filed on Mar. 16, 2017, which is a continuation-in-part of application No. 13/886,248, filed on May 2, 2013, now abandoned.

(60) Provisional application No. 61/641,877, filed on May 2, 2012.

(51) Int. Cl.

| | | |
|---|---|---|
| *E04B 1/19* | (2006.01) | |
| *E04B 1/24* | (2006.01) | |
| *E04B 2/58* | (2006.01) | |
| *E04B 5/10* | (2006.01) | |
| *E04B 7/02* | (2006.01) | |
| *E04C 3/06* | (2006.01) | |
| *E04C 3/32* | (2006.01) | |
| *E06B 1/02* | (2006.01) | |
| *E06B 1/56* | (2006.01) | |
| *F41H 7/04* | (2006.01) | |
| *F41H 5/24* | (2006.01) | |
| *E04C 3/04* | (2006.01) | |
| *E04H 1/12* | (2006.01) | |

(52) U.S. Cl.
CPC .............. *E04B 1/2403* (2013.01); *E04B 2/58* (2013.01); *E04B 5/10* (2013.01); *E04B 7/022* (2013.01); *E04C 3/06* (2013.01); *E04C 3/32* (2013.01); *E06B 1/02* (2013.01); *E06B 1/56* (2013.01); *F41H 5/24* (2013.01); *F41H 7/04* (2013.01); *E04B 2001/199* (2013.01); *E04B 2001/1972* (2013.01); *E04B 2001/2427* (2013.01); *E04B 2001/2448* (2013.01); *E04B 2001/2463* (2013.01); *E04B 2001/2466* (2013.01); *E04B 2001/2481* (2013.01); *E04B 2001/2484* (2013.01); *E04B 2103/06* (2013.01); *E04C 2003/0465* (2013.01); *E04C 2003/0473* (2013.01); *E04H 2001/1283* (2013.01)

(58) Field of Classification Search
CPC .... E04B 1/2403; E04B 2001/199; E04B 5/10; E04B 7/022; F41H 7/04; Y10S 428/911; E05G 1/00; E05G 1/02; E05G 1/024
USPC ................ 52/79.9, 79.12, 106, 481.1, 483.1; 109/1 R, 1 S, 78, 79, 82, 85
See application file for complete search history.

(56) References Cited

U.S. PATENT DOCUMENTS

| | | | | |
|---|---|---|---|---|
| 3,717,964 A * | 2/1973 | Brown | ............... | E04B 1/24 52/79.1 |
| 4,106,245 A * | 8/1978 | Lowe | ............... | E04B 1/08 52/278 |
| 4,221,087 A * | 9/1980 | Lowe | ............... | E04D 3/30 52/91.3 |
| 4,325,309 A * | 4/1982 | King | ............... | F42D 5/045 109/49.5 |
| 4,365,453 A * | 12/1982 | Lowe | ............... | E04B 1/08 52/478 |
| 4,389,947 A * | 6/1983 | King | ............... | F42D 5/045 109/1 S |
| 4,470,357 A * | 9/1984 | Sanzaro | ............... | B32B 15/10 109/84 |
| 5,052,569 A * | 10/1991 | Cooper | ............... | B65D 90/023 220/1.5 |
| 5,511,908 A * | 4/1996 | Van Valkenburgh | ............... | B65F 1/1426 206/386 |
| 5,661,930 A * | 9/1997 | Porter | ............... | E04B 1/344 220/1.5 |
| 5,706,614 A * | 1/1998 | Wiley, Jr. | ............... | E04B 1/3483 52/537 |
| 5,735,639 A * | 4/1998 | Payne | ............... | B65D 88/121 206/386 |
| 6,155,747 A * | 12/2000 | Payne | ............... | B09B 3/00 405/129.55 |
| 6,299,008 B1 * | 10/2001 | Payne | ............... | B65D 88/121 220/1.5 |
| 6,412,231 B1 * | 7/2002 | Palatin | ............... | E04H 9/10 109/1 S |
| 6,415,557 B1 * | 7/2002 | McCalley | ............... | E04B 1/08 52/79.1 |
| 6,484,460 B2 * | 11/2002 | Vanhaitsma | ............... | E02D 27/01 52/274 |
| 7,318,300 B1 * | 1/2008 | Seavy | ............... | E04H 3/08 52/106 |
| 7,827,738 B2 * | 11/2010 | Abrams | ............... | E04B 1/003 52/79.1 |
| 8,079,188 B2 * | 12/2011 | Swartz | ............... | E04H 9/10 52/167.1 |
| 8,112,968 B1 * | 2/2012 | Mueller | ............... | E04H 9/02 52/656.2 |
| 8,286,391 B2 * | 10/2012 | Yang | ............... | E04B 1/3444 52/64 |
| 8,429,857 B2 * | 4/2013 | Melrose | ............... | F41H 5/013 52/169.6 |
| 8,484,929 B1 * | 7/2013 | Begdouri | ............... | E02D 29/045 52/745.03 |
| 8,505,253 B1 * | 8/2013 | Medford | ............... | E04B 1/24 52/302.1 |
| 8,769,908 B1 * | 7/2014 | Santini | ............... | E04C 2/38 446/123 |
| 9,316,015 B1 * | 4/2016 | Elliott | ............... | E04H 9/14 |
| 2006/0080897 A1 * | 4/2006 | O'Neal | ............... | E04H 9/06 52/1 |
| 2007/0044390 A1 * | 3/2007 | Meyer | ............... | E04H 9/10 52/79.1 |
| 2007/0245933 A1 * | 10/2007 | Kramer | ............... | E04B 2/7457 109/49.5 |
| 2007/0271857 A1 * | 11/2007 | Heather | ............... | B65D 88/005 52/79.9 |
| 2008/0010932 A1 * | 1/2008 | Elliott | ............... | E04B 2/7457 52/404.1 |
| 2009/0056237 A1 * | 3/2009 | Dickinson | ............... | E04B 1/34321 52/79.5 |
| 2009/0293420 A1 * | 12/2009 | Smith | ............... | F41H 5/24 52/783.1 |
| 2010/0162929 A1 * | 7/2010 | Smit | ............... | E04B 1/3483 109/79 |
| 2010/0199892 A1 * | 8/2010 | Elliott | ............... | E04B 2/7457 109/83 |
| 2011/0232543 A1 * | 9/2011 | Burroughs | ............... | E04H 9/06 109/79 |
| 2014/0298745 A1 * | 10/2014 | Rechenmacher | ............... | E04B 1/161 52/425 |
| 2015/0322686 A1 * | 11/2015 | Harper | ............... | E04B 1/24 52/481.1 |
| 2015/0345913 A1 * | 12/2015 | Inglefield | ............... | F41H 5/0428 89/36.02 |
| 2016/0025461 A1 * | 1/2016 | Roberts | ............... | B23K 31/02 296/187.07 |

* cited by examiner

FIG. 1e
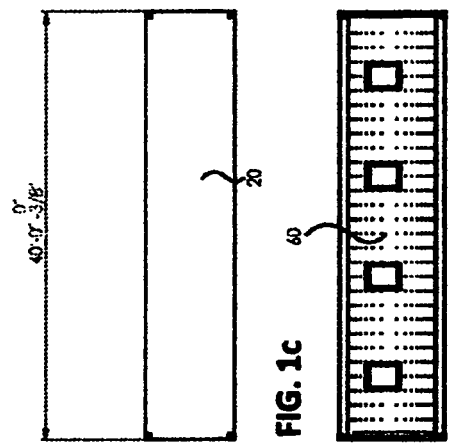
FIG. 1c
FIG. 1b
FIG. 1a
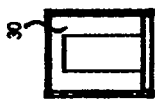
FIG. 1d

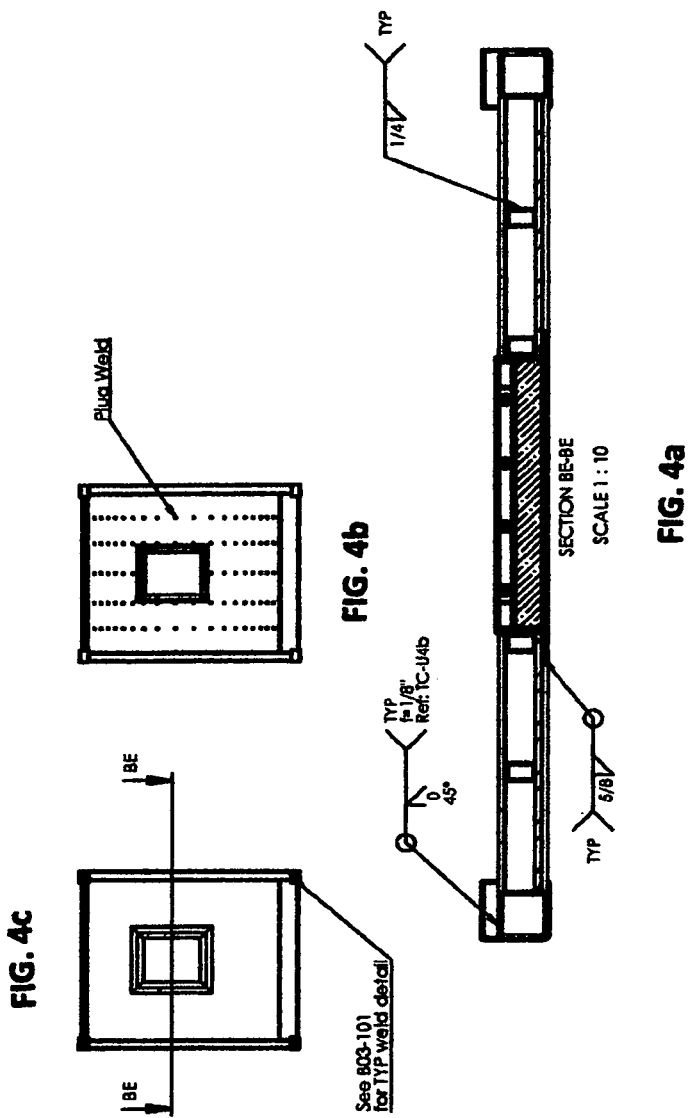

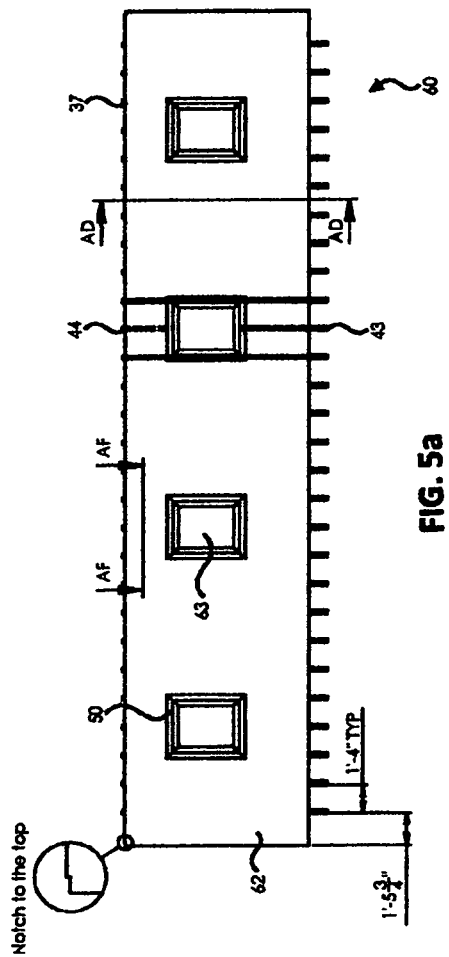
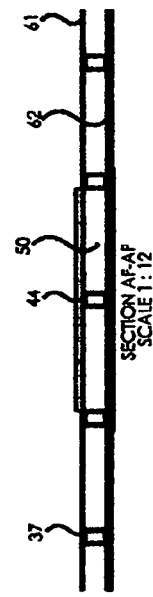

MODULAR ANTI-BALLISTIC SHELTER SYSTEM

CROSS-REFERENCE TO RELATED APPLICATIONS

This patent application is a continuation-in-part and claims the benefit of U.S. patent application Ser. No. 15/461,226 filed Mar. 16, 2017, and U.S. patent application Ser. No. 13/886,248 filed May 2, 2013, which claims the benefit of U.S. Provisional Application No. 61/641,877 filed May 2, 2012. The above applications are incorporated by reference herein in their entirety.

STATEMENT REGARDING FEDERALLY SPONSORED RESEARCH OR DEVELOPMENT

The invention described herein was made by an employee of the United States Government and may be manufactured and used by the Government of the United States of America for governmental purposes without the payment of any royalties thereon or therefore.

FIELD OF INVENTION

This invention relates to the field of armor and more specifically to construction of armored structures which comply with both ISO and State Department Standards.

BACKGROUND OF THE INVENTION

The U.S. Army Corps of Engineers (USACE) currently uses shipping containers as components for transportable shelters to protect troops from ballistics and explosives. This system is known in the art as a Hardened Alternative Trailer System (HATS).

The HATS structures must comply with the U.S. Department of State Certification Standard for Forced Entry and Ballistic Resistance of Structural Systems, SDSTD01.01, without exceeding stringent ISO weight and dimensional specifications. USACE has conducted considerable laboratory research to develop a HATS shelter which concurrently meets most standards. U.S. patent application Ser. No. 13/886,248 (the '248 Application) teaches precise specifications developed by the government to meet ISO Standard No. 668:2013 for twenty-foot structures.

At present, over four hundred structures having the specifications taught in the '248 Application have been fielded "in theater." At a cost of several hundred thousand USD per structure, this technology represents investment in the range of $100,000,000 to the U.S. government. However, these structures are limited to no more than twenty feet in length, and no more than 8 feet wide or 8.6 feet high, which can restrict the utility of the structures.

To address this problem, USACE conducted extensive research and testing to develop precise specifications for forty foot structures. These extensive specifications are taught in co-pending U.S. patent application Ser. No. 15/461,226 filed Mar. 16, 2017.

However, there is a continuing unmet need for considerably larger structures with much greater width and height than are permitted under current ISO standards.

BRIEF SUMMARY OF THE INVENTION

A modular anti-ballistic shelter system incorporates multiples end units. Each end unit includes a base assembly, a top assembly, first and second end wall assemblies, and a sidewall assembly.

The base assembly includes channeled floor/roof support beams extending between floor girders and connected to floor/roof support beams. A floor connects to the floor girders. One of the floor girders has stud apertures spaced 16 inches apart at center.

Each of the channeled floor/roof support beams has a length of 9.59375 feet, a width of 3 inches, a height of 2 inches, and a weight of 7.1 lbs. per foot of length. Each of the floor girders has a length of 39.125 feet and a hollow structural cross-section of 10 by 5 by ⅜ inches. Each of the floor/roof support beams has a length of 7.125 feet and a hollow structural cross-section of 3 by 3 by 5/16 inches. The floor has dimensions of 39.5 feet by 7.395833 feet.

The top assembly includes channeled floor/roof support beams extending between a top girder and a top main girder and connected to floor/roof support beams. A roof connects to and is located above the top girder and the top main girder, while an interior roof connects to and is located below the top girder and the top main girder. The top girder has stud apertures spaced 16 inches apart at center.

The top girder has a length of 39.833 feet and a hollow structural cross-section of 5 by 3 by ½ inches. The top main girder has a length of 39.125 feet and a hollow structural cross-section of 9 by 5 by ¼ inches. The roof has dimensions of 39.95833 feet by 7.95833 feet. The interior roof has dimensions of 39.20833 feet by 7.125 feet.

The first end wall assembly includes two ISO right freight container corner fittings and two ISO left freight container corner fittings, with a bottom frame and a top frame connecting the two ISO right freight container corner fittings to the two ISO left freight container corner fittings. Corner columns connect the two ISO right freight container corner fittings and the two ISO left freight container corner fittings. Exterior and interior plates connect to the bottom frame, the top frame, and the corner columns. The bottom frame and the top frame have stud apertures, with wall studs extending through the stud apertures into the bottom frame and the top frame.

The bottom frame has a length of 6.9270833 feet and a hollow structural cross-section of 10 by 5 by ⅜ inches. The top frame has a length of 6.9270833 feet and a hollow structural cross-section of 5 by 3 by ⅜ inches. Each of the corner columns has a height of 9.166 feet and a hollow structural cross-section of 5 by 5 by ⅜ inches. Each of the wall studs has a height of 9.166 feet and a hollow structural cross-section of 3 by 2 by ¼ inches. The exterior plate has dimensions of 7.125 feet by 8.270833 feet. The interior plate has dimensions of 7.125 feet by 8.270833 feet.

The second end wall assembly includes two ISO right freight container corner fittings and two ISO left freight container corner fittings, with a bottom frame end and a top frame end connecting the two ISO right freight container corner fittings to the two ISO left freight container corner fittings. Corner columns connect the two ISO right freight container corner fittings and the two ISO left freight container corner fittings. Exterior and interior end walls connect to the bottom frame end, the top frame end, and the corner columns. The bottom frame end and the top frame end have stud apertures, with wall studs extending through the stud apertures into the bottom frame end and the top frame end.

The bottom frame end has a length of 7.125 feet and a hollow structural cross-section of 10 by 5 by ⅜ inches. The top frame end has a length of 6.9270833 feet and a hollow structural cross-section of 5 by 3 by ½ inches. The exterior end wall has dimensions of 7.125 feet by 8.270833 feet. The interior end wall has dimensions of 7.125 feet by 8.25 feet.

The sidewall assembly includes exterior and interior sidewalls connected to one of the floor girders and the top girder, with wall studs extending into the top girder and one of the floor girders through the stud apertures in the top girder and one of the floor girders. The exterior sidewall has dimensions of 39.125 feet by 8.25 feet, while the interior sidewall has dimensions of 39.125 feet by 8.25 feet.

BRIEF DESCRIPTION OF SEVERAL VIEWS OF THE DRAWING(S)

FIGS. 1-9 illustrate the components of an exemplary embodiment of an end unit for a modular anti-ballistic shelter system.

FIGS. 1a-1e illustrate the end unit including a base assembly, a top assembly, an endwall assembly with door, an endwall assembly with window, and a sidewall assembly with windows.

Figure 2B:
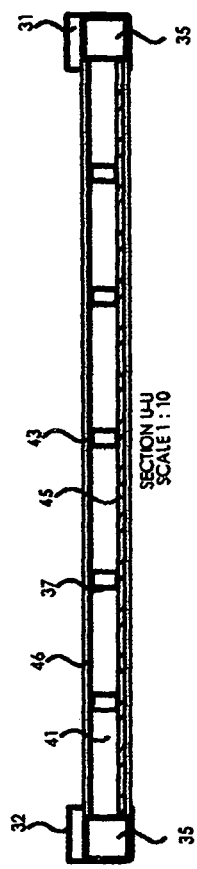
Figure 2A:
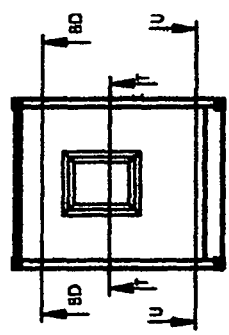
Figure 3B:
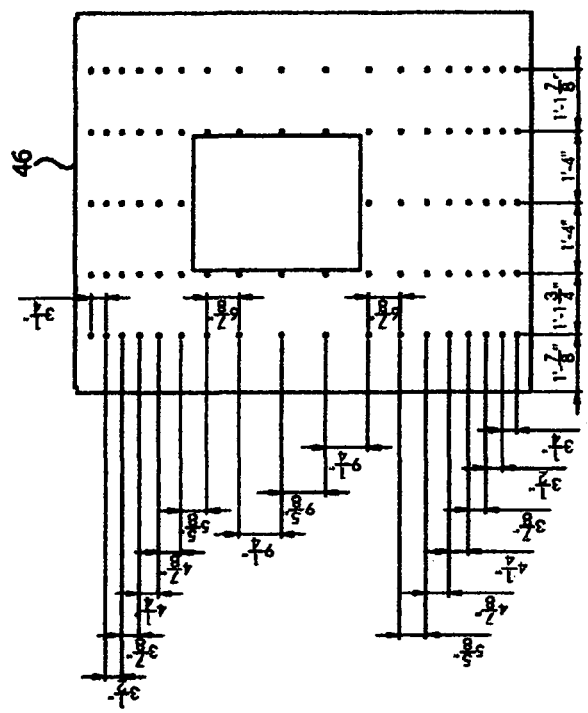
Figure 3A:
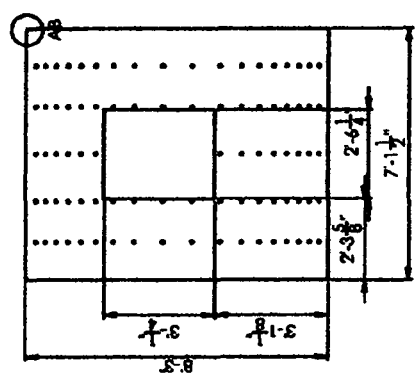

FIGS. 2a & 2c illustrate the end wall assembly with window, including bottom frame end, top frame end, wall studs, bottom jack studs, top jack studs, exterior end wall, interior end wall, and window frame assembly. FIGS. 3a & 3b illustrate the interior end wall. FIGS. 4a 4b & 4c illustrate the end wall assembly with window.

Figure 6A:
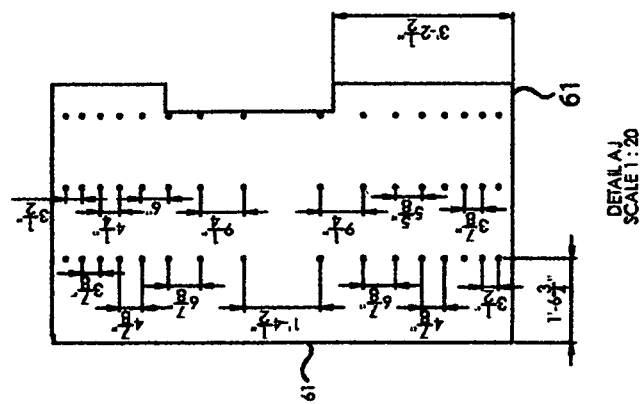
Figure 6B:
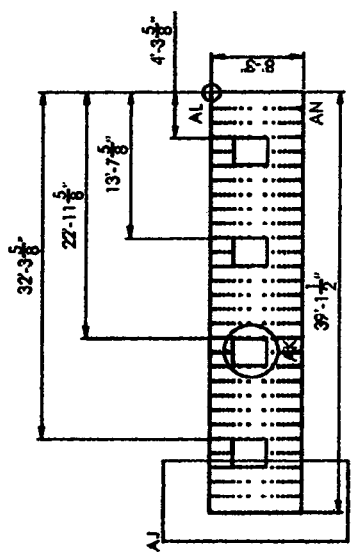
Figure 6C:
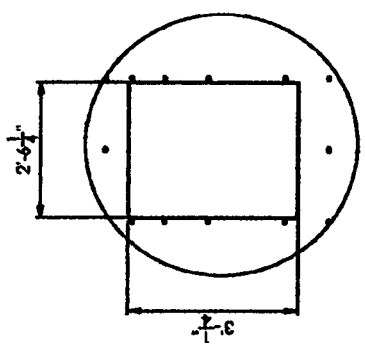

FIGS. 5a & 5b illustrate the sidewall assembly with windows, window frame assemblies, wall studs, bottom jack studs, top jack studs, interior sidewall, and exterior sidewall. FIGS. 6a, 6b & 6c illustrate the interior sidewall with punchouts.

Figure 7:
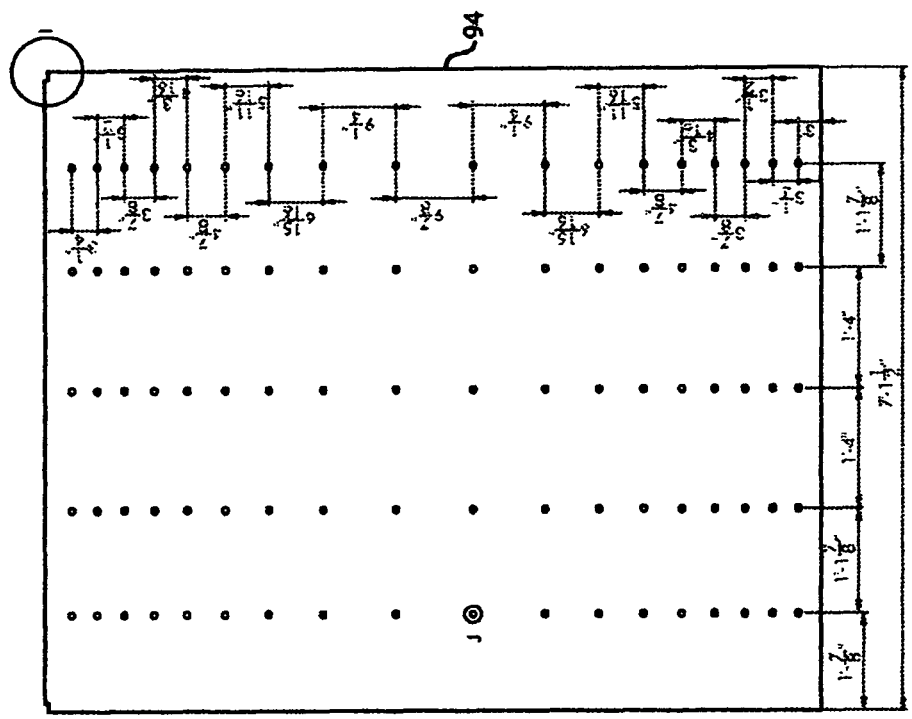

FIG. 7 illustrates the interior end plate and the endwall welds.

Figure 8:
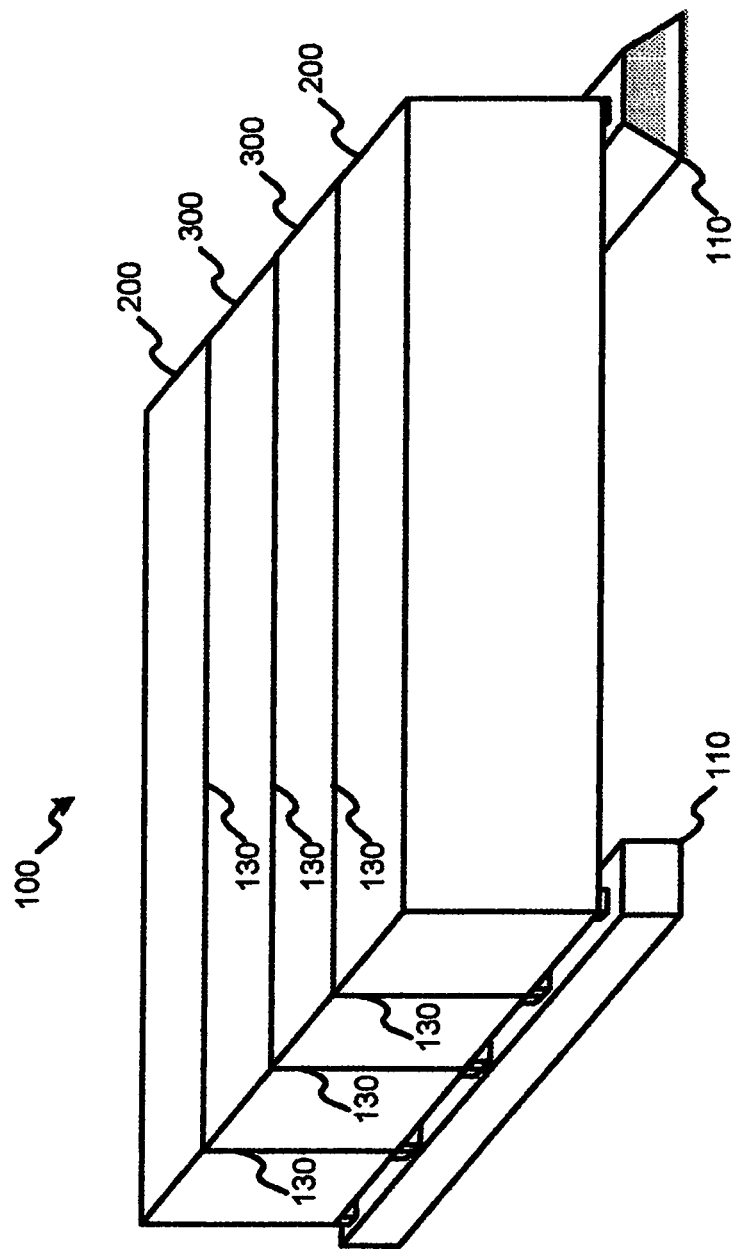

FIG. 8 illustrates the components of an exemplary embodiment of modular anti-ballistic shelter system.

Figure 9A:
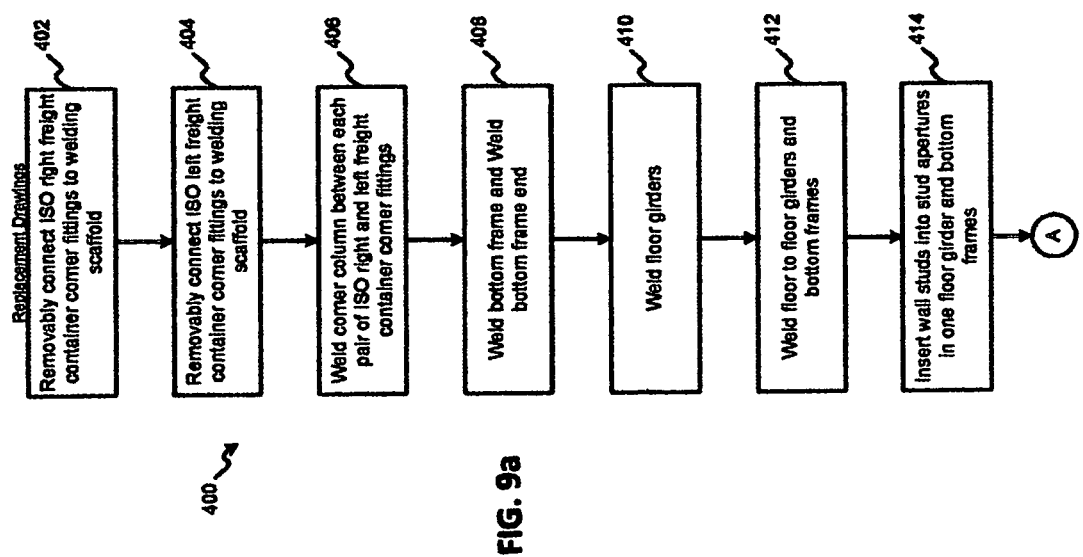
Figure 9B:
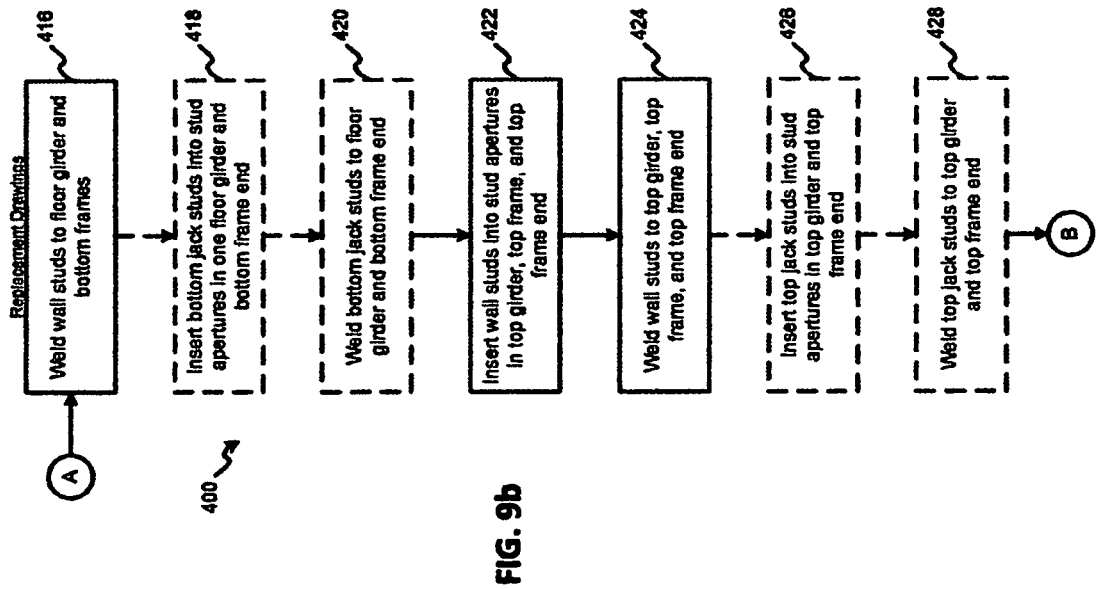
Figure 9C:
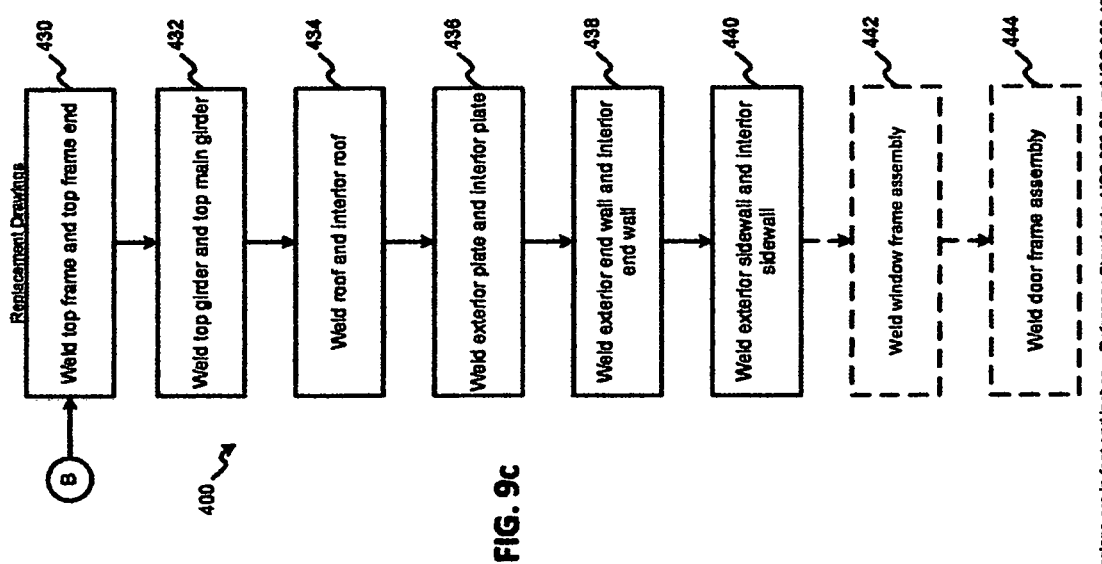

FIGS. 9a, 9b & 9c illustrate a flowchart of an exemplary method for making the end unit for the modular anti-ballistic shelter system.

TERMS OF ART

As used herein, the term "hollow structural cross-section" refers to a measurement of a hollow member including a first dimension, a second dimension, and a wall thickness.

As used herein, the term "inches apart at center" refers to the distance between the centers of spaced structures.

As used herein, the term "ISO freight container corner fitting" refers to a cast metal fitting forming the corner of a structure, having a hollow interior and at least one elongated aperture allowing insertion of the mobile portion of a twistlock.

As used herein, the term "twistlock" refers to a two- or three-portion connector, wherein at least one mobile portion of the connector may be inserted into an elongated aperture in a structure and rotated to prevent removal of the mobile portion from the elongated aperture and separation of the connector from the structure.

As used herein, the term "welding Interface" refers to a joint created by welding to or more pieces of metal together.

As used herein, the term "welding scaffold" refers to a removable frame work used to hold the components of a welded structure in place during fabrication.

DETAILED DESCRIPTION OF THE INVENTION

FIGS. 1-9 illustrate the components of an exemplary embodiment of end unit for modular anti-ballistic shelter system. FIG. 1 illustrates end unit including base assembly 10, top assembly 20, endwall assembly 30 with door, endwall assembly 40 with window, and sidewall assembly 60 with windows. End unit has a weight of approximately 43,786 lbs.

A base assembly 10 may include floor girders, floor/roof support beams, channeled floor/roof support beams, and a floor. Base assembly 10 has a weight of approximately 6,900 lbs.

A top assembly 20 may include floor/roof support beams, channeled floor/roof support beams, top girder, top main girder, roof, and interior roof. Top assembly 20 has a weight of approximately 13,719 lbs.

FIGS. 2a & 2b illustrate end wall assembly 40 with window, including bottom frame end 41, top frame end, wall studs 37, bottom jack studs 43, exterior end wall 45, interior end wall 46, and window frame assembly. In the exemplary embodiment, end wall assembly 40 with window has a weight of approximately 3,507 lbs.

In the exemplary embodiment, exterior end wall 45 and interior end wall 46 are made from sheets of steel 0.0625 inches to 1 inch thick. Thicker sheets (0.5 inches to 1 inch thick) may be used for end units which will see deployment in areas where more protection may be needed. In embodiments without openings in an endwall assembly, wall studs 37 replace bottom jack studs 43 and top jack studs 44, and exterior end wall 45 and interior end wall 46 have neither punchouts nor cutouts for insertion of window frame assembly 50.

Bottom jack studs 43 are inserted into stud apertures and welded into place during assembly. Bottom jack studs 43, similarly to wall studs 37, provide critical anti-ballistic, -blast, and -forced entry properties for areas which include a window assembly 50. Top jack studs 44 are inserted into stud apertures 15 and welded into place during assembly. Top jack studs 44, similarly to wall studs 37 and bottom jack studs 43, provide critical anti-ballistic, -blast, and -forced entry properties. FIGS. 3a & 3b illustrate interior end wall 46, which has dimensions of 7.125 feet by 8.25 feet. FIGS. 4a, 4b & 4c illustrate a cross section of end wall assembly 40 with window and the plug weld pattern.

Figures Sa & 5b illustrate sidewall assembly 60 with windows, window frame assemblies 50, wall studs 37, bottom jack studs 43, top jack studs 44, interior sidewall 61 with punchouts, and exterior sidewall 62 with cutouts. In the exemplary embodiment, sidewall assembly 60 with windows has a weight of approximately 14,185 lbs.

In the exemplary embodiment, interior sidewall 61 and exterior sidewall 62 are made from sheets of steel 0.0625 inches to 1 inch thick. Thicker sheets (0.5 inches to 1 inch thick) may be used for end units which will see deployment in areas where more protection may be needed. In embodiments without openings in a sidewall assembly, wall studs 37 replace bottom jack studs 43 and top jack studs 44, and interior and exterior sidewalls 61 and 62 have neither punchouts nor cutouts for insertion of window frame assembly 50.

FIGS. 6a, 6b & 6c illustrate interior sidewall 61 and the plug weld pattern, which sidewall has dimensions of 39.125 feet by 8.25 feet. FIG. 48 illustrates exterior sidewall, which has dimensions of 39.125 feet by 8.25 feet. FIG. 49 illustrates sidewall assembly 60 with windows welds.

In embodiments of the invention, an optional middle unit may be provided for the modular anti-ballistic shelter system. While only two end units are necessary, in certain embodiments, a user may insert one or more middle units between end units to provide additional space in the system.

Broadly, middle units are similar to end units, but lack sidewall assembly 60 and any attendant structures.

FIG. 7 illustrates interior end plate 94 and its plug weld pattern, which end plate has dimensions of 8.27604166 feet by 7.125 feet.

Wall studs 37 are welded into place using weld type A. Each weld type A is a fillet weld 3 inches long and 0.25 inches wide located at an interface between hollow wall stud 37 and whatever hollow member a stud aperture is located in. Because wall studs 37 extend through stud apertures into a hollow member, even if a weld attaching wall studs 37 is defective or fails, end unit and/or middle unit maintains sufficient structural integrity to resist ballistic, blast and/or forced entry threats. The engagement and attachment between wall studs 37 and stud apertures is sufficiently strong, even without a structural quality weld attaching wall studs 37, to provide end unit and/or middle unit with suitable blast, ballistic and forced entry protection performance.

FIG. 8 illustrates the components of an exemplary embodiment of modular anti-ballistic shelter system 100. FIG. 8 illustrates an exemplary embodiment incorporating two middle units 300 between two end units 200, for a "4×1" system 100.

System 100 includes at least one footer 110 embedded in the ground below end unit 200 and/or middle unit 300. Footer 110 is a concrete platform 111 having at least one metal protrusion 112 extending therefrom. Footer 110 extends below first or second end wall assembly 30 or 40 from one ISO freight container corner fitting to another ISO freight container corner fitting.

FIGS. 9a-9c illustrate a flowchart of an exemplary method 400 for making end unit 200 for modular anti-ballistic shelter system 100.

In step 402, method 400 removably connects 4 ISO right freight container corner fittings to a welding scaffold.

In step 404, method 400 removably connects 4 ISO left freight container corner fittings to the welding scaffold. Each ISO left freight container corner fitting is located directly opposite a corresponding ISO right freight container corner fitting.

In step 406, method 400 welds a corner column between each pair of ISO right freight container corner fittings and each pair of ISO left freight container corner fittings.

In step 408, method 400 welds bottom frame between an ISO left freight container corner fitting and a corresponding ISO right freight container corner fitting 34, and welds bottom frame end between another ISO left freight container corner fitting and another corresponding ISO right freight container corner fitting. Bottom frame end is parallel to bottom frame for middle door.

In step 410, method 400 welds one floor girder between an ISO left freight container corner fitting and a corresponding ISO right freight container corner fitting, and welds another floor girder between another ISO left freight container corner fitting and another corresponding ISO right freight container corner fitting. Floor girders are parallel to each other, and perpendicular to bottom frames.

In step 412, method 400 welds floor to floor girders and bottom frames.

In step 414, method 400 inserts wall studs 37 into stud apertures in one floor girder and bottom frames.

In step 416, method 400 welds wall studs 37 to one floor girder and bottom frames.

In optional step 418, method 400 inserts bottom jack studs 43 into stud apertures in one floor girder and bottom frame end.

In optional step 420, method 400 welds bottom jack studs 43 to one floor girder and bottom frame end.

In step 422, method 400 inserts the wall studs 37 of step 414 into stud apertures in top girder, top frame, and top frame end.

In step 424, method 400 welds wall studs 37 to top girder, top frame, and top frame end.

In optional step 426, method 400 inserts top jack studs 44 into stud apertures in top girder and top frame end.

In optional step 428, method 400 welds top jack studs 44 to top girder and top frame end.

In step 430, method 400 welds top frame between an ISO left freight container corner fitting and a corresponding ISO right freight container corner fitting, and welds top frame end between another ISO left freight container corner fitting and another corresponding ISO right freight container corner fitting. Top frame end is parallel to top frame for middle door.

In step 432, method 400 welds top girder between an ISO left freight container corner fitting and a corresponding ISO right freight container corner fitting, and welds top main girder between another ISO left freight container corner fitting and another corresponding ISO right freight container corner fitting. Top and top main girders are parallel to each other, and perpendicular to top frames.

In step 434, method 400 welds roof and interior roof to the floor/roof support beams, channeled floor/roof support beams, top girder, and top main girder of top assembly.

In step 436, method 400 welds exterior plate and interior plate to bottom frame, corner columns, and top frame for middle door of end wall assembly with door.

In step 438, method 400 welds exterior end wall and interior end wall to bottom frame end, corner columns, and top frame end of end wall assembly with window.

In step 440, method 400 welds an exterior sidewall and an interior sidewall to a floor girder, a top girder, and two corner columns.

In optional step 442, method 400 welds window frame assembly into endwall assembly 40 or sidewall assembly 60.

In optional step 444, method 400 welds door frame assembly into endwall assembly 30 or sidewall assembly 60.

When fabricated, each end unit 200 and each middle unit 300 conform to ISO standards for shipping containers, having outer dimensions of 40 feet long, 8 feet wide, and 8.5 feet tall, and a maximum weight of 66,139 lbs. When end units 200 and optional middle units 300 are assembled into modular anti-ballistic shelter system 100, system 100 meets the U.S. Department of State Certification Standard for Forced Entry and Ballistic Resistance of Structural Systems, SDSTD01.01.

It will be understood that many additional changes in the details, materials, procedures and arrangement of parts, which have been herein described and illustrated to explain the nature of the invention, may be made by those skilled in the art within the principle and scope of the invention as expressed in the appended claims. Moreover, the term "approximate" as used herein may be applied to modify any quantitative representation that could permissibly vary without resulting in a change in the basic function to which it is related.

It should be further understood that the drawings are not necessarily to scale; instead, emphasis has been placed upon illustrating the principles of the invention.

What is claimed is:

1. A modular anti-ballistic shelter system, comprising:
a first sidewall assembly having a first sidewall exterior plate, a first sidewall interior plate, and a plurality of first sidewall wall studs disposed between the first sidewall exterior plate and the first sidewall interior plate;

a second sidewall assembly having a second sidewall exterior plate, a second sidewall interior plate, and a plurality of second sidewall wall studs disposed between the second sidewall exterior plate and the second sidewall interior plate;

a first endwall assembly having a first endwall exterior plate, a first endwall interior plate, and a plurality of first endwall wall studs disposed between the first endwall exterior plate and the first endwall interior plate; and a second endwall assembly having a second endwall exterior plate, a second endwall interior plate, and a plurality of second endwall wall studs disposed between the second endwall exterior plate and the second endwall interior plate;

wherein the first sidewall interior plate is welded to a wall stud of the plurality of first sidewall wall studs via a plurality of plug welds, wherein a distance between adjacent plug welds disposed toward a top of the first sidewall interior plate has a first value, wherein a distance between adjacent plug welds disposed toward a center of the first sidewall interior plate has a second value, wherein a distance between adjacent plug welds disposed toward a bottom of the first sidewall interior plate has a third value, wherein the second value is greater than the first value and the third value, wherein the plurality of first sidewall wall studs comprises eight upper plug welds disposed between the top of the first sidewall interior plate and the center of the first sidewall interior plate and eight lower plug welds disposed between the center of the first sidewall interior plate and the bottom of the first sidewall interior plate, and wherein spacing between adjacent plug welds of the upper eight plug welds is 9¼ inches, 6⅞ inches, 6 inches, 4⅞ inches, 4¼ inches, 3⅞ inches, and 3½ inches, from the center of the first sidewall interior plate to the top of the first sidewall interior plate.

2. The system of claim 1, wherein the first value is 3½ inches, the second value is 16½ inches, and the third value is 3½ inches.

3. The system of claim 1, wherein the first value is 3⅞ inches, the second value is 16½ inches, and the third value is 3⅞ inches.

4. The system of claim 1, wherein spacing between adjacent plug welds of the lower eight plug welds is 9¼ inches, 6⅞ inches, 6 inches, 4⅞ inches, 4¼ inches, 3⅞ inches, and 3½ inches, from the center of the first sidewall interior plate to the bottom of the first sidewall interior plate.

5. The system of claim 1, wherein spacing between adjacent plugs decreases where plug welds are disposed at increasing distances from the center of the first sidewall interior plate.

6. The system of claim 1, wherein spacing between adjacent plugs increases where plug welds are disposed at decreasing distances from the center of the first sidewall interior plate.

7. The system of claim 1, wherein a top-most plug weld of the plurality of plug welds is disposed 3 inches from the top of the first sidewall interior plate.

8. The system of claim 1, wherein a bottom-most plug weld of the plurality of plug welds is disposed 3 inches from the bottom of the first sidewall interior plate.

9. A modular anti-ballistic shelter system, comprising:

a first sidewall assembly having a first sidewall exterior plate, a first sidewall interior plate, and a plurality of first sidewall wall studs disposed between the first sidewall exterior plate and the first sidewall interior plate;

a second sidewall assembly having a second sidewall exterior plate, a second sidewall interior plate, and a plurality of second sidewall wall studs disposed between the second sidewall exterior plate and the second sidewall interior plate;

a first endwall assembly having a first endwall exterior plate, a first endwall interior plate, and a plurality of first endwall wall studs disposed between the first to endwall exterior plate and the first endwall interior plate; and a second endwall assembly having a second endwall exterior plate, a second endwall interior plate, and a plurality of second endwall wall studs disposed between the second endwall exterior plate and the second endwall interior plate;

wherein the first endwall interior plate is welded to a wall stud of the plurality of is first endwall wall studs via a plurality of plug welds, wherein a distance between adjacent plug welds disposed toward a top of the first endwall interior plate has a first value, wherein a distance between adjacent plug welds disposed toward a center of the first endwall interior plate has a second value, wherein a distance between adjacent plug welds disposed toward a bottom of the first endwall interior plate has a third value, wherein the second value is greater than the first value and the third value, wherein the plurality of first endwall wall studs comprises nine upper plug welds disposed between the top of the first endwall interior plate and the center of the first endwall interior plate and nine lower plug welds disposed between the center of the first endwall interior plate and the bottom of the first endwall interior plate, and wherein spacing between adjacent plug welds of the upper nine plug welds is 9¼ inches, 6⅞ inches, 5⅝ inches, 4⅞ inches, 4¼ inches, 3⅞ inches, 3½ inches, and 3¼ inches, from the center of the first endwall interior plate to the top of the first endwall interior plate.

10. The system of claim 9, wherein the first value is 3¼ inches, the second value is 9⅝ inches, and the third value is 3¼ inches.

11. The system of claim 9, wherein the first value is 3½ inches, the second value is 9⅝ inches, and the third value is 3½ inches.

12. The system of claim 9, wherein the first value is 3⅞ inches, the second value is 9⅝ inches, and the third value is 3⅞ inches.

13. The system of claim 9, wherein the first value is 4¼ inches, the second value is 9⅝ inches, and the third value is 4¼ inches.

14. The system of claim 9, wherein spacing between adjacent plug welds of the lower eight plug welds is 9¼ inches, 6⅞ inches, 5⅝ inches, 4⅞ inches, 4¼ inches, 3⅞ inches, 3½ inches, and 3¼ inches, from the center of the first endwall interior plate to the bottom of the first endwall interior plate.

15. The system of claim 9, wherein spacing between adjacent plugs decreases where plug welds are disposed at increasing distances from the center of the first endwall interior plate.

16. The system of claim 9, wherein spacing between adjacent plugs increases where plug welds are disposed at decreasing distances from the center of the first endwall interior plate.

\* \* \* \* \*